UNITED STATES PATENT OFFICE.

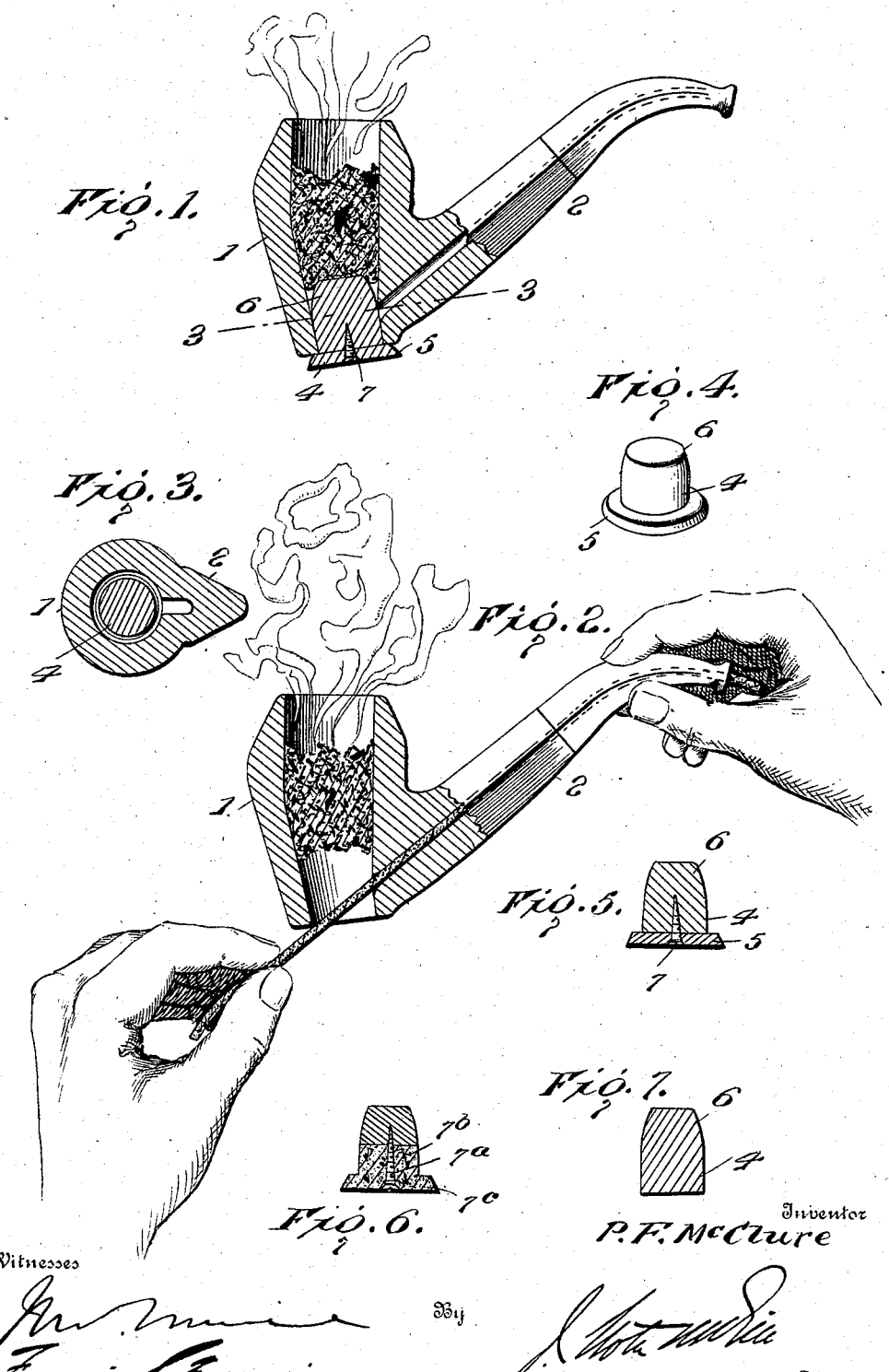

PATTISON F. McCLURE, OF PIERRE, SOUTH DAKOTA.

SMOKING-PIPE.

No. 867,826.  Specification of Letters Patent.  Patented Oct. 8, 1907.

Application filed September 21, 1906. Serial No. 335,620.

*To all whom it may concern:*

Be it known that I, PATTISON F. McCLURE, of Pierre, in the county of Hughes and State of South Dakota, have invented certain new and useful Improvements in Smoking-Pipes; and I do hereby declare the following to be a full, clear, and exact description of the invention, such as will enable others skilled in the art to which it appertains to make and use the same.

The objects of this invention are to provide in a smoking pipe means for effecting the absorption and retention of the nicotin and other dangerous products of combustion; to enable the draft opening to be readily freed of obstructions without in any way interfering with the burning load in the pipe; to insure the burning of the entire load; to effect the cooling of the smoke before leaving the pipe; to prevent any contact between the saliva passing down the stem from the smoker's mouth and the load of tobacco in the bowl of the pipe; and to keep that portion of the bowl usually grasped by the user relatively cool.

The invention will be hereinafter fully set forth and particularly pointed out in the claims.

In the accompanying drawings, Figure 1 is a longitudinal section of my improved pipe. Fig. 2 shows a cleaner inserted while the load is burning. Fig. 3 is a horizontal section on line 3—3, Fig. 1. Fig. 4 shows the absorbent plug removed. Figs. 5, 6 and 7 show modified forms of plugs.

Referring to the drawings, 1 designates the bowl and 2 the stem, the opening of which latter opens into the bowl a short distance above the bottom thereof and on a plane that intersects the opening in the bottom of the bowl. The latter at its bottom has a central opening which is closed by a removable plug 4 which comprises an outer disk 5 and a truncated cone 6 of suitable absorbent material. This cone, excepting at its base, does not contact with the bore of the bowl, but extends upwardly into the latter so as to leave an uninterrupted surrounding air space between it and the bowl so that the smoke will be cooled before entering the stem, the plane of the opening of which latter is intersected by the cone of the plug. The outer portion of the base of the bowl will also be cooled, making it easy to handle. This cone and disk constituting the plug are preferably made in two pieces, suitably united, the disk portion being capable of being grasped so that the plug may be readily turned axially. When the absorbent material becomes heavily charged with nicotin or moisture it may be discarded and fresh clean absorbent material substituted.

According to the form shown in Figs. 1 and 5 the cone is detachably secured to the disk by a screw 7 extending centrally from the latter, the cone being made entirely of absorbent material its full length. In Fig. 6 I have shown a shorter cone detachably secured by a screw $7^a$ extending centrally through a base $7^b$ having a disk $7^c$, the base and disk being of cork or other suitable material. The lower end of the plug, which normally lies below the bottom of the bowl, need not be of any increased diameter, but only of sufficient width to act as a stop for the plug, and at the same time to permit it to be readily grasped either for withdrawing the plug or turning the latter in the bowl, as shown in Fig. 7. In any event the base of the plug is cylindrical so as to fit air-tight against the bore of the bowl, and thus hold the absorbent material centrally within the latter.

In practice, the tobacco is loaded and packed down directly on top of the plug which will take up all the nicotin of the tobacco and prevent the same from passing off with the smoke, and likewise saliva flowing through the stem will be absorbed, thus keeping the tobacco perfectly dry. There is no diaphragm or partition of any kind between the tobacco load and the absorbent plug. If particles of the tobacco should lodge over the end of the draft opening they may be readily dislodged by a slight axial turning of the plug, but should the obstruction be within the pipe stem, it may be readily removed by first withdrawing the plug and then blowing through the stem, or by inserting a straw or cleaning brush therethrough. This may be accomplished without removing or in any way disturbing the load, as shown in Fig. 2.

The advantages of my invention will be apparent to all smokers. Not only is the smoke cooled by reason of circling around the absorbent plug, but the lower exterior of the bowl is kept cool. When a plug becomes thoroughly charged with nicotin or moisture it may be readily withdrawn and a fresh plug substituted, or a fresh cone attached to the disk. A pipe constructed in accordance with my invention is less liable to clogging and readily permits of freeing any stoppage that may occur, this being done while the pipe is in use. It will also be noted that a pipe so constructed permits of great ease in cleaning both the bowl and stem.

I claim as my invention:—

1. A pipe for smoking tobacco comprising a bowl and a stem, said bowl being open at its upper and lower ends, and said stem having a draft opening entering said bowl immediately above the lower open end thereof, and a plug of absorbent material removably fitted in the lower end of said bowl and forming the bottom thereof, said plug intersecting the plane of said draft opening and forming a support for the tobacco load above said opening.

2. A pipe for smoking tobacco comprising a bowl and a stem, said bowl being open at its upper and lower ends, and said stem having a draft opening entering said bowl immediately above the lower open end thereof, and a plug of absorbent material removably fitted in the lower end of said bowl and forming the bottom thereof, said plug intersecting the plane of said draft opening and forming a support for the tobacco load above such opening, and formed to provide a continuous surrounding space between itself and the wall of the bowl.

3. A pipe for smoking tobacco comprising a bowl and a stem, said bowl being open at its upper and lower ends, and said stem having a draft opening entering said bowl immediately above the lower open end thereof, and a plug of absorbent material removably fitted in the lower end of said bowl and forming the bottom thereof, said plug comprising a truncated cone of absorbent material intersecting the plane of said draft opening and having a base fitted against the lower end of the bowl.

4. A pipe for smoking tobacco comprising a bowl and a stem, said bowl being open at its upper and lower ends, and said stem having a draft opening entering said bowl immediately above the lower open end thereof, and a plug of absorbent material removably fitted in the lower end of said bowl and forming the bottom thereof, said plug comprising a truncated cone of absorbent material intersecting the plane of said draft opening, its lower end projecting beneath the bowl sufficiently to permit the plug to be grasped and forming a stop therefor against the bottom of the bowl.

5. A pipe for smoking tobacco comprising a bowl and a stem, said bowl being open at its upper and lower ends, and said stem having a draft opening entering said bowl on a plane intersecting the opening in the bottom of the bowl, and a plug of absorbent material removably fitted in the lower end of the bowl and forming the bottom thereof, said plug forming a support for the tobacco load above said draft-opening and being wholly removable without disturbing the load to permit the cleaning of the stem opening.

In testimony whereof, I have signed this specification in the presence of two subscribing witnesses.

PATTISON F. McCLURE.

Witnesses:
H. P. WILLIAMS,
M. B. BROWN.